US012583070B2

(12) United States Patent
Nagao et al.

(10) Patent No.: US 12,583,070 B2
(45) Date of Patent: Mar. 24, 2026

(54) TURNING METHOD, MACHINING SYSTEM, AND NON-TRANSITORY COMPUTER READABLE STORAGE MEDIUM

(71) Applicant: Yamazaki Mazak Corporation, Niwa-gun (JP)

(72) Inventors: Ryo Nagao, Niwa-gun (JP); Takeshi Yasui, Niwa-gun (JP); Youji Tamura, Niwa-gun (JP)

(73) Assignee: YAMAZAKI MAZAK CORPORATION, Niwa-gun (JP)

( * ) Notice: Subject to any disclaimer, the term of this patent is extended or adjusted under 35 U.S.C. 154(b) by 537 days.

(21) Appl. No.: 18/319,484

(22) Filed: May 18, 2023

(65) Prior Publication Data

US 2023/0302595 A1 Sep. 28, 2023

Related U.S. Application Data

(63) Continuation of application No. PCT/JP2021/002450, filed on Jan. 25, 2021.

(51) Int. Cl.
B23B 25/06 (2006.01)
B23B 1/00 (2006.01)
(Continued)

(52) U.S. Cl.
CPC ............... B23Q 15/12 (2013.01); B23B 1/00 (2013.01); B23B 7/12 (2013.01); B23B 25/06 (2013.01); *B23Q 2705/102* (2013.01)

(58) Field of Classification Search
CPC .... B23Q 15/12; B23Q 2705/102; B23B 1/00; B23B 7/12; B23B 25/06
See application file for complete search history.

(56) References Cited

U.S. PATENT DOCUMENTS

| | | | | |
|---|---|---|---|---|
| 4,974,165 A | * | 11/1990 | Locke | ............... G05B 19/4166 700/192 |
| 5,917,726 A | | 6/1999 | Pryor | |
| 2020/0285221 A1 | | 9/2020 | Kakumoto et al. | |

FOREIGN PATENT DOCUMENTS

| | | |
|---|---|---|
| EP | 3705954 | 9/2020 |
| GB | 2114478 | 8/1983 |

(Continued)

OTHER PUBLICATIONS

International Preliminary Report on Patentability (Chapter I) with translation of Written Opinion for corresponding International Application No. PCT/JP2021/002450, Aug. 3, 2023.

(Continued)

*Primary Examiner* — Michael W Choi
(74) *Attorney, Agent, or Firm* — MORI & WARD, LLP

(57) ABSTRACT

A turning method includes driving a first movement apparatus to locate a cutting edge of a turning tool at a first radial position; driving a second movement apparatus to move the turning tool in an axial direction to perform first turning with the cutting edge at the first radial position; driving the second movement apparatus to move the turning tool away from a workpiece in the axial direction after performing the first turning; calculating an error between the processed dimension and a target dimension; driving a third movement apparatus, which is configured to move the turning tool relative to the first movement apparatus in a radial direction, to locate the cutting edge of the turning tool at a second radial position to correct the error; and driving the second movement apparatus to move the turning tool in the axial direction to perform second turning at the second radial position.

16 Claims, 8 Drawing Sheets

(51) Int. Cl.
B23B 7/12 (2006.01)
B23Q 15/12 (2006.01)

(56) References Cited

FOREIGN PATENT DOCUMENTS

| | | |
|----|------------|---------|
| JP | 50-154892 | 12/1975 |
| JP | 51-055080 | 5/1976 |
| JP | 58-137542 | 8/1983 |
| JP | 2002-052445 | 2/2002 |
| JP | 2002-307202 | 10/2002 |
| JP | 2002-326142 | 11/2002 |
| JP | 2019-141941 | 8/2019 |
| JP | 2020-144729 | 9/2020 |

OTHER PUBLICATIONS

Supplementary European Search Report for corresponding EP Application No. 21921084.6-1103, Nov. 7, 2023.
European Office Action for corresponding EP Application No. 21921084.6-1103, Nov. 21, 2023.
International Search Report for corresponding International Application No. PCT/JP2021/002450, Apr. 20, 2021.
Written Opinion for corresponding International Application No. PCT/JP2021/002450, Apr. 20, 2021.
Japanese Office Action for corresponding JP Application No. 2021-534192 , Oct. 19, 2021, (w/ English machine translation).
Japanese Office Action for corresponding JP Application No. 2021-534192, Dec. 15, 2021, (w/ English machine translation).

* cited by examiner

TURNING METHOD, MACHINING SYSTEM, AND NON-TRANSITORY COMPUTER READABLE STORAGE MEDIUM

CROSS-REFERENCE TO RELATED APPLICATIONS

The present application is a continuation application of International Application No. PCT/JP2021/002450, filed Jan. 25, 2021. The contents of this application are incorporated herein by reference in their entirety.

BACKGROUND OF THE INVENTION

Field of the Invention

The present invention relates to a turning method, a machining system, and a non-transitory computer readable storage medium.

Discussion of the Background

In machine working in a radial direction, in a case where a narrow dimensional tolerance, for example, a dimensional tolerance of 10 μm or less is demanded, it is common to perform turning with a grinding allowance left with respect to a target dimension beforehand and then repeat grinding and dimension measurement to keep the finished dimension within a tolerance of the target dimension. On the other hand, in order to perform machine working in the radial direction with high accuracy by only turning, it is necessary to conduct control for correcting an error in relative movement between a spindle apparatus and a turning tool.

For example, JP 58-137542 A discloses, in machining a key groove, a machining apparatus (combined lathe) into which a mechanism for finely adjusting the distance from a tool post to the rotation axis of the spindle is incorporated, so that a worn amount can be corrected without exchanging a tool (turning tool) that is worn. A machine stand attached to be slidable vertically and horizontally with respect to the direction of the rotation axis of the spindle is provided on a cross slide that is slidable in the direction of the rotation axis, and a rod-shaped tool is arranged and fixed on the tool post mounted on the machine stand so as to extend in a direction perpendicular to the rotation axis. In such an apparatus, by moving the rod-shaped tool forward or backward in a static or dynamic manner in its longitudinal direction, the outer diameter dimension and the roundness of a workpiece are made to be finely adjustable.

SUMMARY OF THE INVENTION

According to one aspect of the present invention, a turning method includes rotating a workpiece about a rotation axis; driving a first movement apparatus, which is configured to move a turning tool in a radial direction of the rotation axis, to locate a cutting edge of the turning tool at a first radial position in the radial direction; driving a second movement apparatus, which is configured to move the turning tool in an axial direction parallel to the rotation axis, to move the turning tool toward the workpiece in the axial direction to perform first turning on the workpiece while the cutting edge is kept at the first radial position in the radial direction; driving the second movement apparatus to move the turning tool in the axial direction away from the work-piece after performing the first turning on the workpiece; measuring a processed dimension of the workpiece on which the first turning has been performed; calculating an error between the processed dimension and a target dimension; driving a third movement apparatus, which is configured to move the turning tool relative to the first movement apparatus in the radial direction, to locate the cutting edge of the turning tool at a second radial position in the radial direction to correct the error; and driving the second movement apparatus to move the turning tool toward the workpiece in the axial direction to perform second turning on the work-piece while the cutting edge is kept at the second radial position in the radial direction.

According to another aspect of the present invention, a turning method includes rotating a workpiece about a rotation axis; driving a second movement apparatus, which is configured to move the turning tool in an axial direction parallel to the rotation axis, to locate a cutting edge of the turning tool at a first axial position in the axial direction; driving a first movement apparatus, which is configured to move a turning tool in a radial direction of the rotation axis, to move the turning tool toward the workpiece in the radial direction to perform first turning on the workpiece while the cutting edge is kept at the first axial position in the axial direction; driving the first movement apparatus to move the turning tool in the radial direction away from the workpiece after performing the first turning on the workpiece; measuring a processed dimension of the workpiece on which the first turning has been performed; calculating an error between the processed dimension and a target dimension; driving a fourth movement apparatus, which is configured to move the turning tool relative to the second movement apparatus in the axial direction, to locate the cutting edge of the turning tool at a second axial position in the axial direction to correct the error; and driving the first movement apparatus to move the turning tool toward the workpiece in the radial direction to perform second turning on the work-piece while the cutting edge is kept at the second axial position in the axial direction.

According to another aspect of the present invention, a machining system includes a machining apparatus config-ured to perform turning on a workpiece, a measuring appa-ratus configured to measure a dimension of the workpiece, and a controller. The machining apparatus includes a spindle configured to rotate the workpiece about a rotation axis; a first movement apparatus configured to move a turning tool in a radial direction of the rotation axis; a second movement apparatus configured to move the turning tool in an axial direction parallel to the rotation axis; and a third movement apparatus configured to move the turning tool relative to the first movement apparatus in the radial direction and having a movable range in the radial direction smaller than a movable range in the radial direction of the first movement apparatus. The controller is configured to drive the first movement apparatus to locate a cutting edge of the turning tool at a first radial position in the radial direction; drive the second movement apparatus to move the turning tool toward the workpiece in the axial direction to perform first turning on the workpiece while the cutting edge is kept at the first radial position in the radial direction; drive the second movement apparatus to move the turning tool in the axial direction away from the workpiece after performing the first turning on the workpiece; measure, with the measuring apparatus, a processed dimension of the workpiece on which the first turning has been performed; calculate an error between the processed dimension and a target dimension; drive the third movement apparatus to locate the cutting edge of the turning tool at a second radial position in the radial direction to correct the error; and drive the second movement apparatus to move the turning tool toward the workpiece in the axial direction to perform second turning on the workpiece while the cutting edge is kept at the second radial position in the radial direction.

According to another aspect of the present invention, a machining system includes a machining apparatus configured to perform turning on a workpiece, a measuring apparatus configured to measure a dimension of the workpiece, and a controller. The machining apparatus includes a spindle configured to rotate the workpiece about a rotation axis; a first movement apparatus configured to move a turning tool in a radial direction of the rotation axis; a second movement apparatus configured to move the turning tool in an axial direction parallel to the rotation axis; and a fourth movement apparatus configured to move the turning tool relative to the second movement apparatus in the axial direction and having a movable range in the axial direction smaller than a movable range in the axial direction of the second movement apparatus. The controller is configured to drive the second movement apparatus to locate a cutting edge of the turning tool at a first axial position in the axial direction; drive the first movement apparatus to move the turning tool toward the workpiece in the radial direction to perform first turning on the workpiece while the cutting edge is kept at the first axial position in the axial direction; drive the first movement apparatus to move the turning tool in the radial direction away from the workpiece after performing the first turning on the workpiece; measure, with the measuring apparatus, a processed dimension of the workpiece on which the first turning has been performed; calculate an error between the processed dimension and a target dimension; drive the fourth movement apparatus to locate the cutting edge of the turning tool at a second axial position in the axial direction to correct the error; and drive the first movement apparatus to move the turning tool toward the workpiece in the radial direction to perform second turning on the workpiece while the cutting edge is kept at the second axial position in the axial direction.

According to another aspect of the present invention, a non-transitory computer readable storage medium retrievably stores a computer-executable program therein. The computer-executable program causes a computer to perform a turning method. The turning method includes rotating a workpiece about a rotation axis; driving a first movement apparatus, which is configured to move a turning tool in a radial direction of the rotation axis, to locate a cutting edge of the turning tool at a first radial position in the radial direction; driving a second movement apparatus, which is configured to move the turning tool in an axial direction parallel to the rotation axis, to move the turning tool toward the workpiece in the axial direction to perform first turning on the workpiece while the cutting edge is kept at the first radial position in the radial direction; driving the second movement apparatus to move the turning tool in the axial direction away from the workpiece after performing the first turning on the workpiece; measuring a processed dimension of the workpiece on which the first turning has been performed; calculating an error between the processed dimension and a target dimension; driving a third movement apparatus, which is configured to move the turning tool relative to the first movement apparatus in the radial direction, to locate the cutting edge of the turning tool at a second radial position in the radial direction to correct the error; and driving the second movement apparatus to move the turning tool toward the workpiece in the axial direction to perform second turning on the workpiece while the cutting edge is kept at the second radial position in the radial direction.

According to the other aspect of the present invention, a non-transitory computer readable storage medium retrievably stores a computer-executable program therein. The computer-executable program causes a computer to perform a turning method. The turning method includes rotating a workpiece about a rotation axis; driving a second movement apparatus, which is configured to move the turning tool in an axial direction parallel to the rotation axis, to locate a cutting edge of the turning tool at a first axial position in the axial direction; driving a first movement apparatus, which is configured to move a turning tool in a radial direction of the rotation axis, to move the turning tool toward the workpiece in the radial direction to perform first turning on the workpiece while the cutting edge is kept at the first axial position in the axial direction; driving the first movement apparatus to move the turning tool in the radial direction away from the workpiece after performing the first turning on the workpiece; measuring a processed dimension of the workpiece on which the first turning has been performed; calculating an error between the processed dimension and a target dimension; driving a fourth movement apparatus, which is configured to move the turning tool relative to the second movement apparatus in the axial direction, to locate the cutting edge of the turning tool at a second axial position in the axial direction to correct the error; and driving the first movement apparatus to move the turning tool toward the workpiece in the radial direction to perform second turning on the workpiece while the cutting edge is kept at the second axial position in the axial direction.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
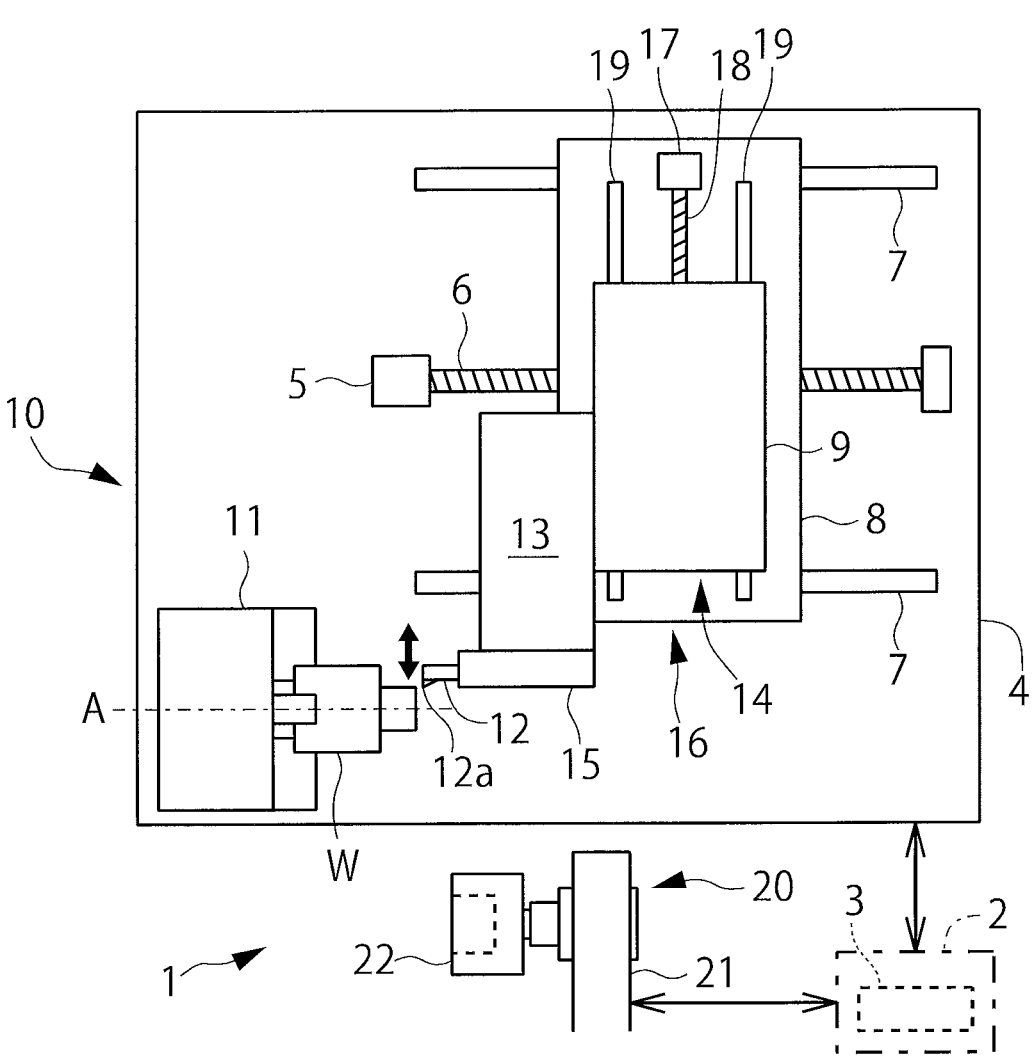
FIG. 1 is a side view (partial block diagram) of main components of a turning system in one embodiment of the present invention.

The embodiments will now be described with reference to the accompanying drawings, wherein like reference numerals designate corresponding or identical elements throughout the various drawings.

Hereinafter, a turning method, a machining system, and a machining program for a workpiece according to the present invention will be described in detail with reference to FIGS. 1 to 6.

First, a configuration of the machining system will be described with reference to FIG. 1.

As illustrated in FIG. 1, a machining system 1 includes a processing machine 10 and a controller 2, which controls operations of the processing machine 10. The controller 2 is capable of driving the processing machine 10 in accordance with a machining program 3, which has been stored beforehand, can causing the processing machine 10 to automatically perform turning on a workpiece W. In addition, a robot 20, which serves as a measuring apparatus for measuring a processed dimension of the workpiece W, is provided outside the processing machine 10, and the controller 2 controls the driving of the robot 20 in a similar manner. Here, the controller 2 may be installed in a plurality of locations, and may include a control circuit connected with a communication unit. For example, some or all of control processes for driving the robot 20 may be conducted by a control circuit that is installed in another location different from the location where a control circuit for controlling the driving of the processing machine 10 is installed.

The processing machine 10 includes: a spindle apparatus (an example of "a spindle") 11, which holds the workpiece W and which rotates the workpiece W about a rotation axis A; a tool post 13, such as a turret, to which a turning tool 12 is fixed; a first movement apparatus 14, which moves the turning tool 12 together with the tool post 13 in a radial direction of the rotation axis A to adjust the position of a cutting edge 12a of the turning tool 12; and a second movement apparatus 16, which moves the turning tool 12 together with the first movement apparatus 14 and the tool post 13 in parallel with the rotation axis A to adjust the position of the cutting edge 12a of the turning tool 12. In addition, a third movement apparatus 15, which is capable of moving the turning tool 12 relative to the tool post 13, is provided between the tool post 13 and the turning tool 12. It is to be noted that the turning tool 12 is disposed to extend substantially in parallel with the rotation axis A.

Here, the second movement apparatus 16 includes a carriage 8, a linear guide 7, a ball screw 6, and a servomotor 5. The carriage 8 is attached to the two rails of the linear guide 7, which are provided on a base 4 of the processing machine 10, and which extends in parallel with the rotation axis A. The carriage 8 is slidable along the linear guide 7, and is further screwed by the ball screw 6, which extends in parallel with the rotation axis A. The ball screw 6 is connected with the servomotor 5. By driving the servomotor 5, the ball screw 6 is rotated to enable the carriage 8 to move in parallel with the rotation axis A.

Furthermore, the first movement apparatus 14 includes: a tool post base 9, which is connected with the tool post 13; a linear guide 19; a ball screw 18; and a servomotor 17. The tool post base 9 is attached to the two rails of the linear guide 19, which are provided on the carriage 8 of the second movement apparatus 16, and which extend in the radial direction of the rotation axis A. The tool post base 9 is slidable along the linear guide 19, and is further screwed by the ball screw 18, which extends in parallel with the linear guide 19. The ball screw 18 is connected with the servomotor 17. By driving the servomotor 17, the ball screw 18 is rotated to enable the tool post base 9 of the first movement apparatus 14 to move relative to the carriage 8 of the second movement apparatus 16 in the radial direction of the rotation axis A.

The first movement apparatus 14 causes the turning tool 12 to be movable in the radial direction of the rotation axis A with respect to the workpiece W to be subject to turning, and a radial position of the cutting edge 12a is adjusted. In addition, the second movement apparatus 16 causes the turning tool 12 to be movable in a direction parallel to the rotation axis A with respect to the workpiece W to be subject to turning, and an axial position of the cutting edge 12a is adjusted. Thus, the cutting edge 12a of the turning tool 12 is adjusted to a cutting position, and it becomes possible to give a feed in turning. For the first movement apparatus 14 and the second movement apparatus 16, a sufficient amount of movement corresponding to the size of the workpiece W has to be ensured in a feed accompanied by such turning and retraction to be described later. The first movement apparatus 14 and the second movement apparatus 16 each may have a movable range equal to or larger than 100 millimeters, for example.

Further, the third movement apparatus 15 is capable of moving the turning tool 12 relative to the first movement apparatus 14 in the radial direction of the rotation axis A. The third movement apparatus 15 is preferably higher in positional accuracy than the first movement apparatus 14, and is smaller in movable range than the first movement apparatus 14. The third movement apparatus 15 has a movable range in which an error of a processed dimension caused by semi-finishing processing of the workpiece W based on the positional accuracy of the first movement apparatus 14 is correctable in finishing processing, and is capable of determining the position of the cutting edge 12a with high accuracy. It is to be noted that the movable range of the third movement apparatus 15 may be equal to or smaller than one millimeter, for example. That is, the movable range of the third movement apparatus 15 may be $\frac{1}{100}$ or less the movable range of the first movement apparatus 14. Thus, the position of the cutting edge 12a, which has been adjusted by the first movement apparatus 14, is further finely adjustable in the radial direction of the rotation axis A. Examples of the method for driving the third movement apparatus 15 may include elastic deformation of a tool holder by use of hydraulic pressure, the use of a linear motor, the use of a slider screwed with a ball screw rotated by a servomotor.

The robot 20, which serves as a measuring apparatus, includes a measuring instrument 22 at a tip end of a robot arm 21, inserts its tip end into the inside of the processing machine 10 from the outside of the machine in accordance with a drive command from the controller 2, and is thus capable of measuring the processed dimension of the workpiece W, which is held by the spindle apparatus 11. For example, an air gauge using an air micrometer of pneumatic type can be suitably used for the measuring instrument 22.

Next, as an operation of the machining system 1, a method for performing turning on an outer surface or an inner surface of the workpiece W will be described with reference to FIG. 2 together with FIGS. 3 and 4. It is to be noted that the workpiece W is held by the spindle apparatus 11, in a state in which rough processing has been completed on the workpiece W.

Figure 2:
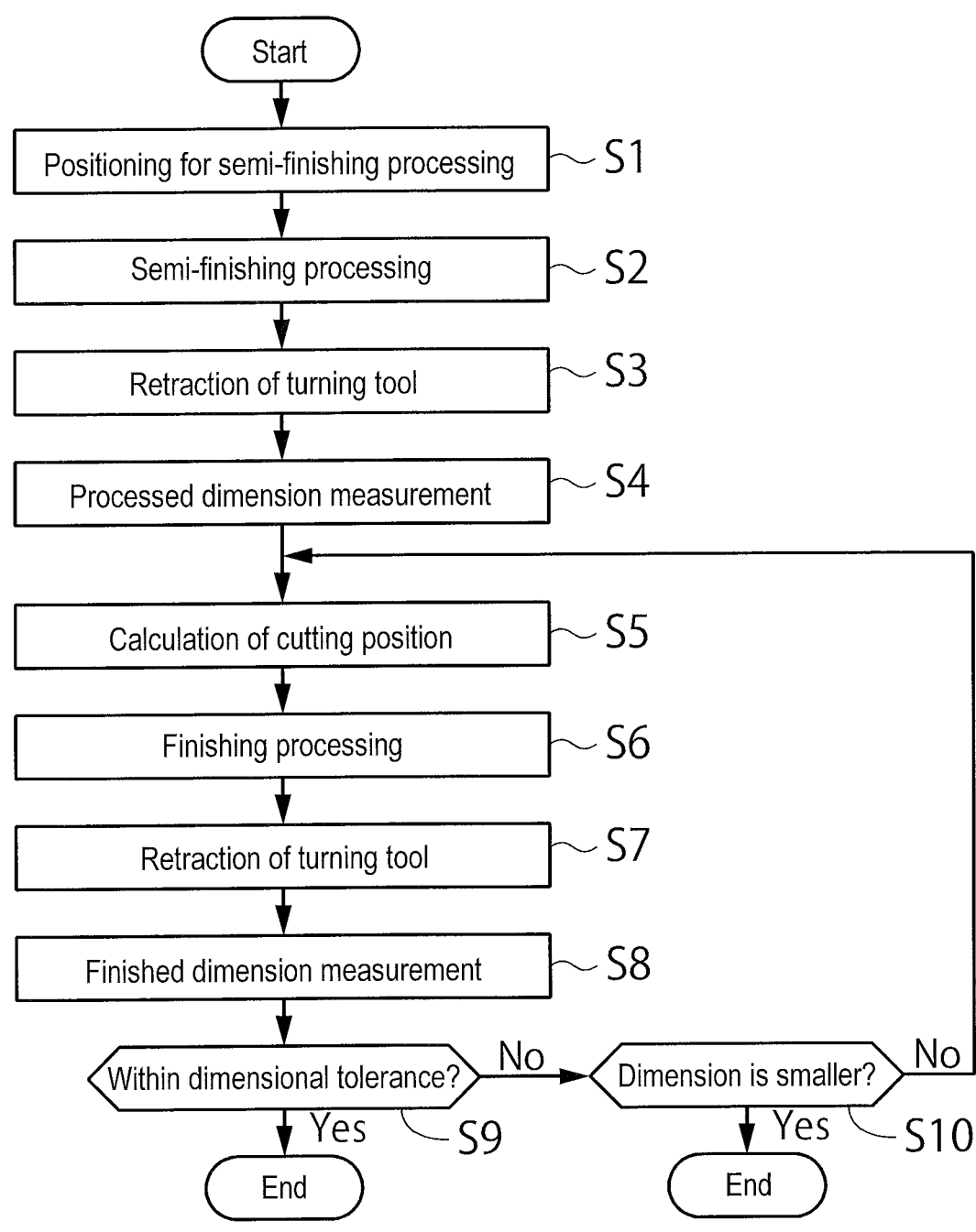
FIG. 2 is a flowchart illustrating a turning method.
Figure 3A:
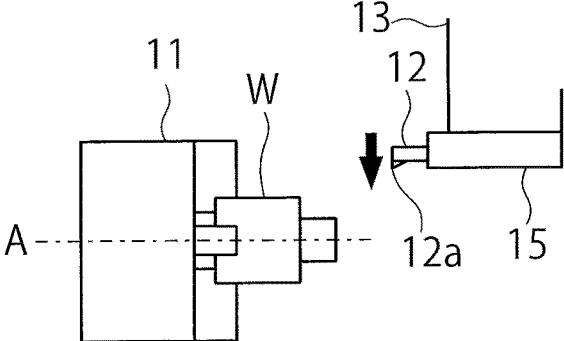
FIG. 3A is a side view illustrating an arrangement of a cutting edge with respect to a cutting position in the turning method.

Referring to FIG. 2 together with FIG. 3A, the workpiece W, which is held by the spindle apparatus 11, is rotated about the rotation axis A. Then, the first movement apparatus 14 (see FIG. 1) is driven to locate the cutting edge 12a of the turning tool 12, which is attached to the tool post 13, at a cutting position for the semi-finishing processing of the workpiece W, and positioning is performed (S1). Here, the cutting position for the semi-finishing processing is specified by a radial position in which a finishing allowance is left with respect to a target dimension in the finishing processing in consideration of the positional accuracy of the first movement apparatus 14 in the radial direction, and an axial position for starting a feed in performing turning in the axial direction parallel to the rotation axis A. Such an axial position is adjusted by the second movement apparatus 16.

Figure 3B:
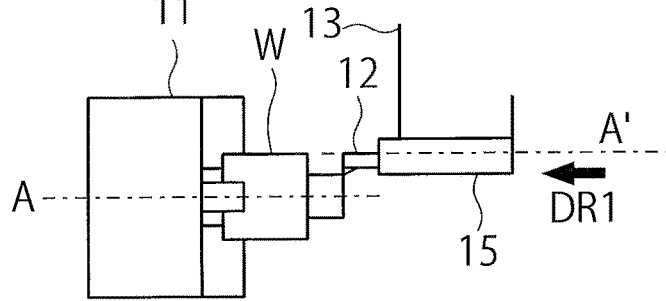
FIG. 3B is a side view illustrating semi-finishing processing in the turning method.

Then, as illustrated in FIG. 3B, the second movement apparatus 16 is driven to move the turning tool 12, which is attached to the tool post 13, together with the first movement apparatus 14 in a first direction DR1 toward the spindle apparatus 11 along a movement axis A', which is parallel to the rotation axis A, and turning as the semi-finishing processing is performed on the workpiece W (S2).

Figure 3C:
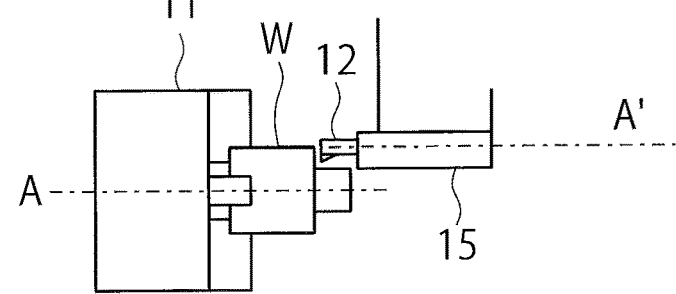
FIG. 3C is a side view illustrating separation of the cutting edge from a surface of a workpiece in the turning method.

Here, as illustrated in FIG. 3C, after turning is performed to a predetermined position, the third movement apparatus 15 is preferably driven to separate the cutting edge 12a from the surface of the workpiece W.

Figure 3D:
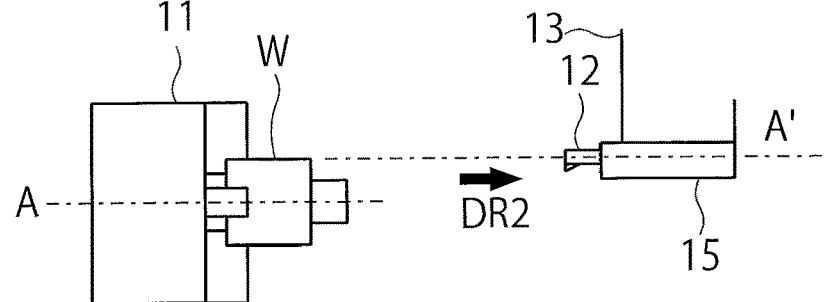
FIG. 3D is a side view illustrating retraction of a turning tool in the turning method.

Next, as illustrated in FIG. 3D, the second movement apparatus 16 is driven to move the tool post 13 in a second direction DR2, which is a reverse direction to the first direction DR1 along the movement axis A', which is parallel to the rotation axis A, and the turning tool 12 is retracted from the vicinity of the workpiece W (S3). In this situation, the driving of the first movement apparatus 14 is locked, and the first movement apparatus 14 does not move in the radial direction of the tool post 13. In the retraction in this manner, as described above, the third movement apparatus 15 is driven to separate the cutting edge 12a from the surface of the workpiece W, so that an occurrence of a return mark can be prevented. It is to be noted that the occurrence of the return mark may not necessarily be prevented, and the driving of the third movement apparatus 15 for separating the cutting edge 12a from the surface of the workpiece W may be omitted.

Figure 4A:
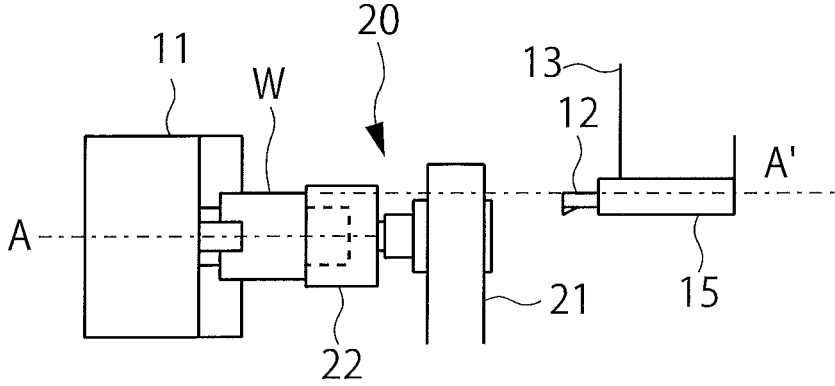
FIG. 4A is a side view illustrating a dimension measurement in the turning method.

Next, as illustrated in FIG. 4A, the processed dimension of the workpiece W is measured (S4). Here, the measurement is conducted by driving the robot 20, which serves as the measuring apparatus, to insert the robot arm 21 from the outside of the processing machine 10 and bring the measuring instrument 22 into close proximity to the workpiece W. Since the turning tool 12 has been retracted as described above, the measuring instrument 22 can be brought into close proximity to the workpiece W. It is to be noted that, instead of the robot 20, a measuring instrument provided in the machine may be used, or the measurement may be conducted manually by an operator. The processed dimension that has been measured is input, as a measurement result, into the controller 2.

The controller 2 calculates a radial position of the cutting position for next finishing processing, based on the measurement result of the processed dimension of the workpiece W (S5). In detail, the radial position is determined to correct an error between a target value of a finished dimension and the processed dimension that has been measured. Then, the third movement apparatus 15 is driven to adjust the position of the turning tool 12 so as to locate the cutting edge 12a at the radial position that has been determined.

Figure 4B:
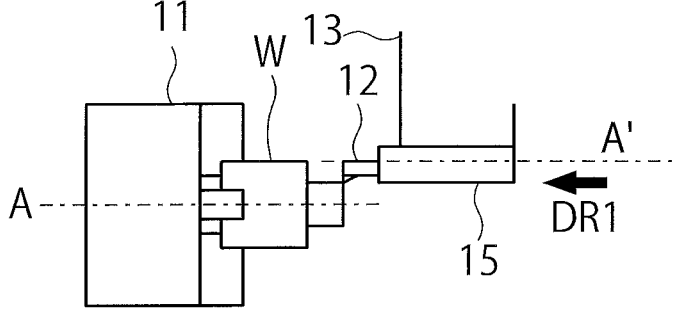
FIG. 4B is a side view illustrating finishing processing in the turning method.

Next, as illustrated in FIG. 4B, as the finishing processing, the second movement apparatus 16 is driven to move the turning tool 12, which is attached to the tool post 13, again in the first direction DR1 along a movement axis A', which is parallel to the rotation axis A, and turning is performed on the workpiece W (S6).

Figure 4C:
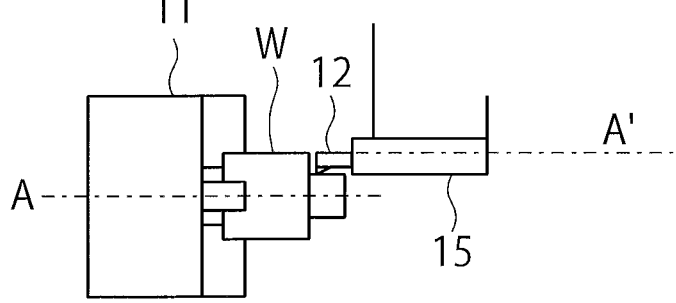
FIG. 4C is a side view illustrating completion of the finishing processing in the turning method.

Then, as illustrated in FIG. 4C, turning is performed to a predetermined position, and the finishing processing ends. After the finishing processing ends, the third movement apparatus 15 may be driven to separate the cutting edge 12a from the surface of the workpiece W.

Furthermore, the turning tool 12 is retracted (S7), and the finished dimension is measured (S8). Here, in a case where the finished dimension falls within a dimensional tolerance, the first movement apparatus 14 and the second movement apparatus 16 are returned to the original positions, and the turning processing ends (S9; Yes). In this situation, a correction value for the third movement apparatus 15 to correct an error in the finished dimension may be calculated to be used for next finishing processing.

In a case where the finished dimension does not fall within the dimensional tolerance, the remainder of the machining allowance is checked (S9; No). In a case where the finished dimension that has been measured is smaller than a predetermined one and no machining allowance remains (S10; Yes), an alarm is issued and then the processing ends. On the other hand, in a case where the finished dimension is larger than the predetermined one and the machining allowance remains (S10; No), the processing returns to the calculation of the cutting position in the finishing processing (S5), and performs the calculation again. It is to be noted that the driving of the processing machine 10 and the driving of the robot 20 are each based on a command from the controller 2 in accordance with the machining program 3.

By performing turning in the above-described method, the turning tool 12 is not moved by the first movement apparatus 14, after the positioning in the semi-finishing processing (S1) until the finishing processing (S6). In other words, the position of the first movement apparatus 14 remains fixed at least until the finishing processing (S6). This makes the dimensional accuracy in the radial direction irrelevant to the positional accuracy of the first movement apparatus 14 in the finishing processing, and makes the dimensional accuracy in the radial direction dependent on the positional accuracy of the third movement apparatus 15. As described above, the third movement apparatus 15 is higher in positional accuracy than the first movement apparatus 14, and turning is enabled with such high positional accuracy. This also meets the demand for a narrow dimensional tolerance of, for example, 10 μm or less. That is, machine working for which the narrow dimensional tolerance is demanded is achievable by only turning, without depending on grinding.

It is to be noted that in a case of performing turning on a plurality of workpieces W successively, it is conceivable that the first movement apparatus 14 is not made to move, the movement is limited to only the direction parallel to the rotation axis A by the second movement apparatus 16, and the finishing processing is performed by use of an identical correction value to omit the dimension measurement after the semi-finishing processing. However, a thermal displacement of the processing machine 10 caused by repeated machining and/or a plurality of times of repeated movements of the second movement apparatus 16 in the direction parallel to the rotation axis A can be assumed to degrade the dimensional accuracy in the radial direction. For this reason, the dimension measurement (S4) after the semi-finishing processing is preferably performed on each workpiece W every time.

In addition, the thermal displacement caused by successively performing turning on the plurality of workpieces W can also occur in the third movement apparatus 15. On the other hand, as described above, the third movement apparatus 15 has a smaller movable range. Hence, the thermal displacement that occurs in the third movement apparatus 15 is much smaller than the thermal displacement in the first movement apparatus 14 or the second movement apparatus 16, each of which has a larger movable range. Therefore, even in the case where the thermal displacement occurs due to successive machining, the machine working for which a narrow dimensional tolerance is demanded is achievable, according to the above-described turning method.

Figure 5:
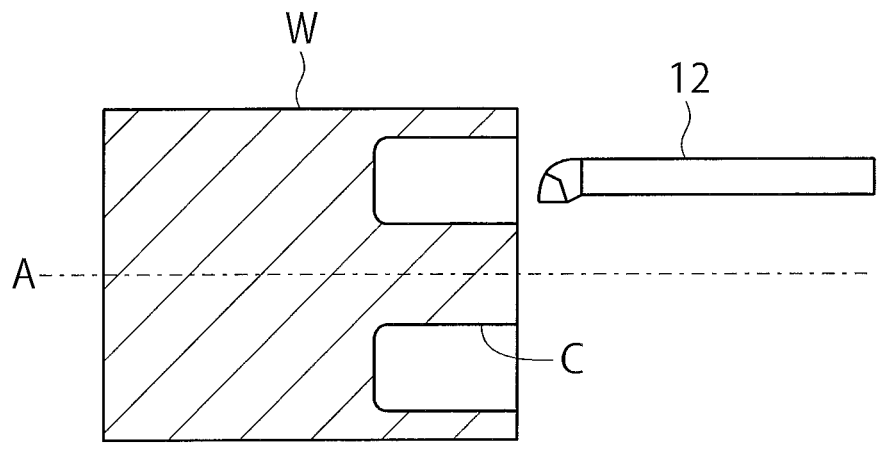
FIG. 5 is a cross-sectional view illustrating an arrangement example of the workpiece and the turning tool.

In addition, as illustrated in FIG. 5, the turning tool 12 is also preferably arranged to extend substantially in parallel with the rotation axis A. Such an arrangement also enables turning to be performed, in the above-described method, on the inside of a circular recess C, which is centered around the rotation axis A in the workpiece W. That is, the cutting edge 12a of the turning tool 12 is inserted into the recess C to perform turning on the respective wall surfaces of an inner surface side and an outer surface side. Therefore, even though it is difficult to insert a grinding wheel into the recess or the like of the workpiece, or even though the grinding wheel is insertable but grinding requires time and labor, the machine working for which a narrow dimensional tolerance is demanded is achievable automatically and successively.

Figure 6:
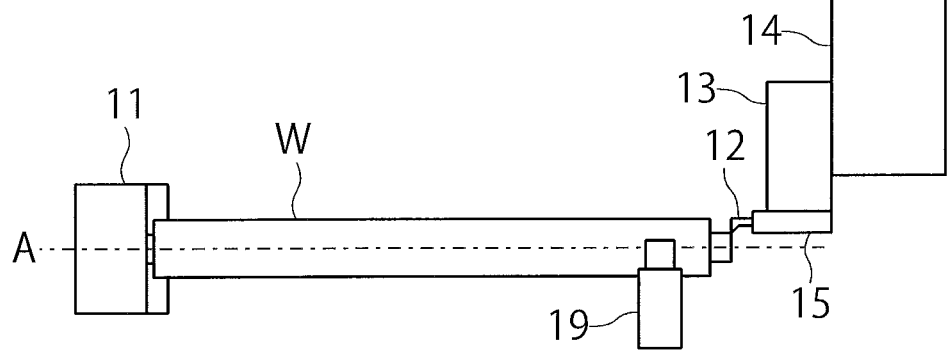
FIG. 6 is a side view illustrating a state in which a steady rest is disposed in a long workpiece.

As illustrated in FIG. 6, in the case of performing turning on the workpiece W having a long size in the direction along the rotation axis A, it is desirable to arrange a steady rest 19, which supports the workpiece W, between the spindle apparatus 11 and the cutting position of the turning tool 12 for cutting the workpiece W, in a similar manner to other cases of turning. Such an arrangement also enables turning to be performed in a similar manner as described above.

It is to be noted that even in a case of performing only finishing processing without performing the semi-finishing processing, by applying the same method from the measurement of the processed dimension (S4) that has been described above, the machine working for which a narrow dimensional tolerance is demanded is achievable by only turning. In addition, the turning method that has been described above is usable for performing turning on the inner surface and the outer surface of the workpiece. The processing machine 10 may be another type of processing machine, such as the turret lathe or the combined processing machine described above.

Next, a turning method for performing turning on an end surface that is a surface orthogonal to the rotation axis A in the workpiece will be described. First, a configuration of the processing machine will be described.

Figure 7:
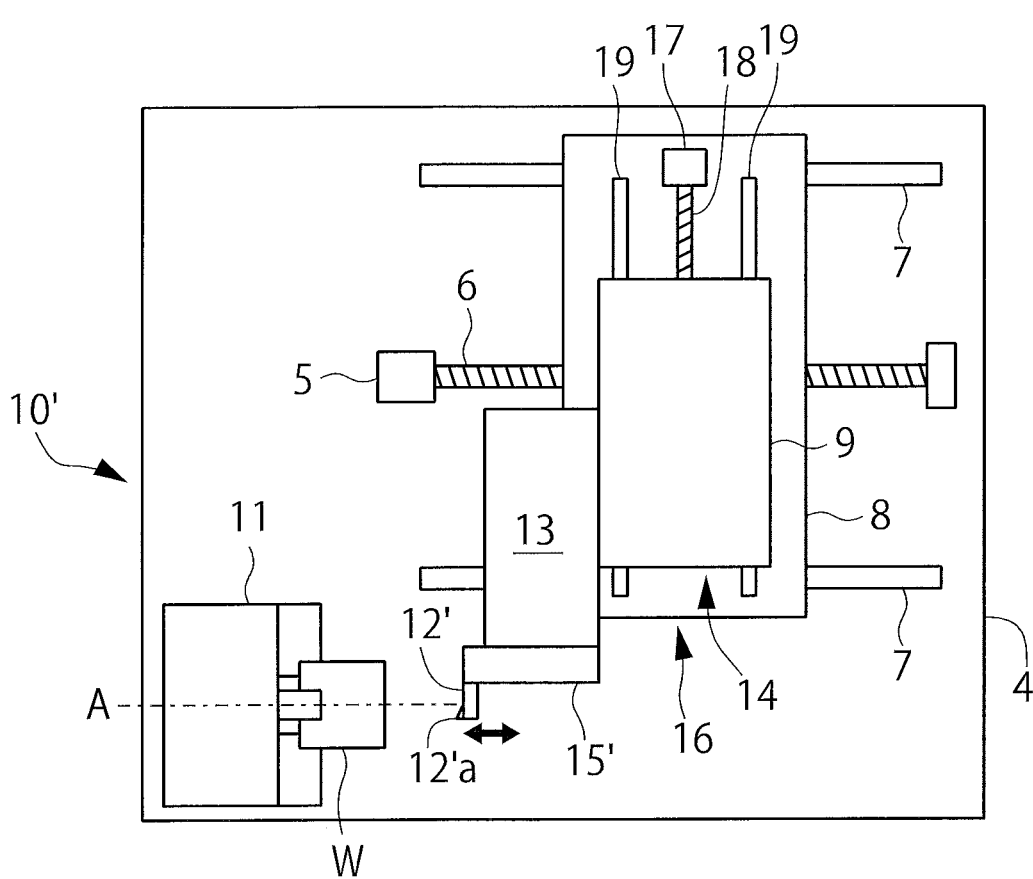
FIG. 7 is a side view of main components of a turning system in another embodiment of the present invention.

As illustrated in FIG. 7, a processing machine 10' is common to the processing machine 10, which has been described above, except some components. What is mainly different is that a fourth movement apparatus 15', which moves a turning tool 12' in parallel with the rotation axis A, is provided instead of the third movement apparatus 15, which moves the turning tool 12 in the radial direction of the rotation axis A. Specifically, in contrast to the processing machine 10, in the processing machine 10', with regard to the tool post 13, the entire movement apparatus including the turning tool is exchanged. In a case where a turret is used as the tool post 13, such a turret is rotated to complete this exchange. The other components such as the first movement apparatus 14 and the second movement apparatus 16 are similar to those of the processing machine 10.

The fourth movement apparatus 15' is also higher in positional accuracy than the second movement apparatus 16, as in the case of the third movement apparatus 15. Therefore, the fourth movement apparatus 15' preferably has a movable range smaller than that of the second movement apparatus 16. The fourth movement apparatus 15' has a movable range in which an error of the processed dimension caused by the semi-finishing processing on the workpiece W based on the positional accuracy of the second movement apparatus 16 is correctable in the finishing processing, and the position of a cutting edge 12'a can be determined with high accuracy. It is to be noted that the movable range of the fourth movement apparatus 15' may be equal to or smaller than one millimeter, for example. That is, the movable range of the fourth movement apparatus 15' may be $1/100$ or less the movable range of the second movement apparatus 16.

Other details of the fourth movement apparatus 15' are similar to those of the third movement apparatus 15, and thus the descriptions will be omitted.

Next, a turning method for performing turning on an end surface of the workpiece W by use of the processing machine 10' will be described.

Figure 8A:
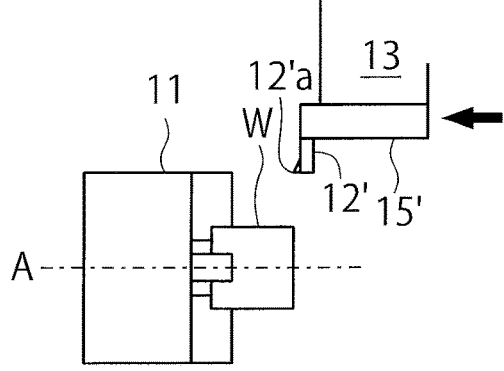
FIG. 8A is a side view illustrating an arrangement of the cutting edge in the cutting position in the turning method.

Referring to FIG. 2 together with FIG. 8A, the workpiece W, which is held by the spindle apparatus 11, is rotated about the rotation axis A. Then, the second movement apparatus 16 (see FIG. 7) is driven to locate the cutting edge 12'a of the turning tool 12', which is attached to the tool post 13, at a cutting position for the semi-finishing processing of the workpiece W, and positioning is performed (S1). Here, the cutting position for the semi-finishing processing is specified by an axial position in which a finishing allowance is left with respect to a target dimension in the finishing processing in consideration of the positional accuracy of the second movement apparatus 16 in the axial direction parallel to the rotation axis A, and a radial position for starting a feed in performing turning in the radial direction of the rotation axis A. Such a radial position is adjusted by the first movement apparatus 14.

Figure 8B:
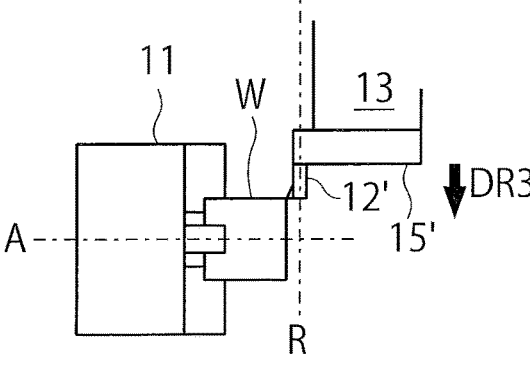
FIG. 8B is a side view illustrating semi-finishing processing in the turning method.

Then, as illustrated in FIG. 8B, the first movement apparatus 14 is driven to move the turning tool 12', which is attached to the tool post 13, in a third direction DR3 toward the rotation center of the rotation axis A in the workpiece W and along a movement axis R in the radial direction of the rotation axis A, and turning as the semi-finishing processing is performed on an end surface of the workpiece W (S2).

Figure 8C:
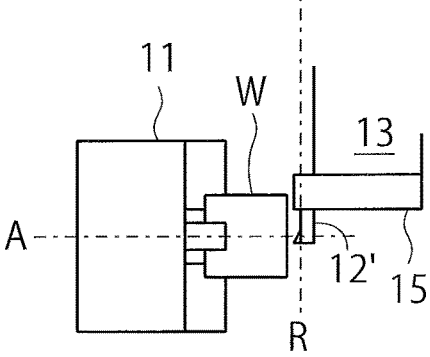
FIG. 8C is a side view illustrating separation of the cutting edge from a surface of a workpiece in the turning method.

Here, as illustrated in FIG. 8C, after turning is performed to a predetermined position, the fourth movement apparatus 15' is preferably driven to separate the cutting edge 12'a from the surface of the workpiece W.

Figure 8D:
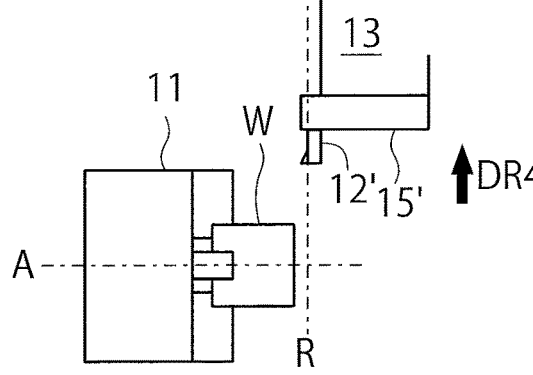
FIG. 8D is a side view illustrating retraction of the turning tool in the turning method.

Next, as illustrated in FIG. 8D, the first movement apparatus 14 is driven to move the turning tool 12', which is attached to the tool post 13, in a fourth direction DR4, which is a reverse direction to the third direction DR3, along the movement axis R in the radial direction of the rotation axis A, and the turning tool 12' is retracted from the vicinity of the workpiece W (S3). In this situation, the driving of the second movement apparatus 16 is locked, and the second movement apparatus 16 does not move in a direction parallel to the rotation axis A of the tool post 13. In the retraction in this manner, the fourth movement apparatus 15' as described above is driven to separate the cutting edge 12'$a$ from the surface of the workpiece W, so that an occurrence of a return mark can be prevented. It is to be noted that the occurrence of the return mark may not necessarily be prevented, and the driving of the fourth movement apparatus 15' for separating the cutting edge 12'$a$ from the surface of the workpiece W may be omitted.

Figure 9A:
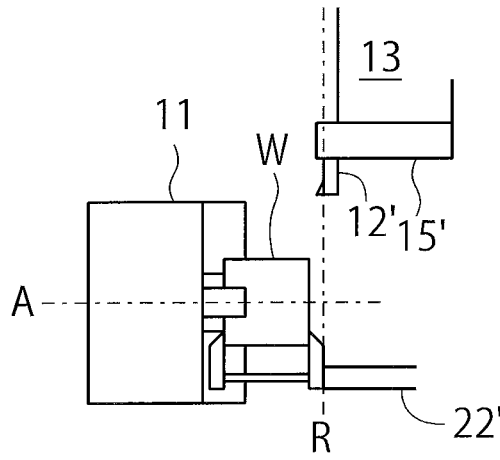
FIG. 9A is a side view illustrating a dimension measurement in the turning method.

Next, as illustrated in FIG. 9A, the processed dimension of the workpiece W is measured (S4). For example, the distance between end surfaces is measured by a measuring instrument 22' having a caliper-like shape, so that the distance can be set as a processed dimension. The processed dimension that has been measured is input, as a measurement result, into the controller 2.

The controller 2 calculates an axial position of the cutting position for next finishing processing, based on the measurement result of the processed dimension of the workpiece W (S5). In detail, the axial position is determined to correct an error between a target value of the finished dimension and the dimension that has been measured. Then, the fourth movement apparatus 15' is driven to adjust the position of the turning tool 12' so as to locate the cutting edge 12'$a$ at the axial position that has been determined.

Figure 9B:
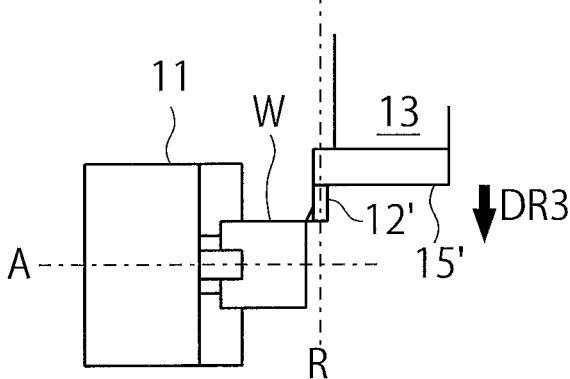
FIG. 9B is a side view illustrating finishing processing in the turning method.

Next, as illustrated in FIG. 9B, as the finishing processing, the first movement apparatus 14 is driven to move the turning tool 12', which is attached to the tool post 13, again in the third direction DR3 along the movement axis R in the radial direction of the rotation axis A, and turning is performed on the workpiece W (S6).

Figure 9C:
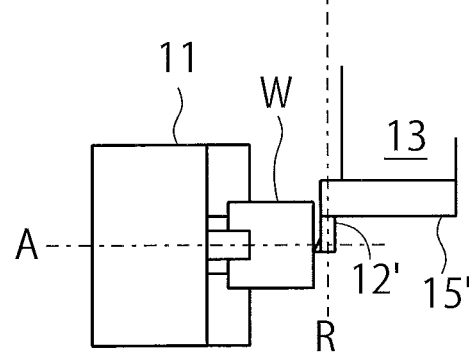
FIG. 9C is a side view illustrating completion of the finishing processing in the turning method.

Then, as illustrated in FIG. 9C, turning is performed to a predetermined position, and the finishing processing ends. Other details of the turning method are similar to those of the turning method by the above-described processing machine 10, and thus the descriptions will be omitted.

By performing turning in the above-described method, the turning tool 12' is not moved by the second movement apparatus 16, after the positioning in the semi-finishing processing (S1) until the finishing processing (S6). In other words, the driving of the second movement apparatus 16 remains locked at least until the finishing processing (S6). This makes the dimensional accuracy in a direction parallel to the rotation axis A irrelevant to the positional accuracy of the second movement apparatus 16 in the finishing processing, and makes the dimensional accuracy dependent on the positional accuracy of the fourth movement apparatus 15'. As described above, the fourth movement apparatus 15' is higher in positional accuracy than the second movement apparatus 16, and turning is enabled with such high positional accuracy. This also meets the demand for a narrow dimensional tolerance of, for example, 10 μm or less. That is, machine working for which the narrow dimensional tolerance is demanded is achievable by only turning, without depending on grinding.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A turning method comprising:
   rotating a workpiece about a rotation axis;
   driving a first movement apparatus, which is configured to move a turning tool in a radial direction of the rotation axis, to locate a cutting edge of the turning tool at a first radial position in the radial direction;
   driving a second movement apparatus, which is configured to move the turning tool in an axial direction parallel to the rotation axis, to move the turning tool toward the workpiece in the axial direction to perform first turning on the workpiece while the cutting edge is kept at the first radial position in the radial direction;
   driving the second movement apparatus to move the turning tool in the axial direction away from the workpiece after performing the first turning on the workpiece;
   measuring a processed dimension of the workpiece on which the first turning has been performed;
   calculating an error between the processed dimension and a target dimension;
   driving a third movement apparatus, which is configured to move the turning tool relative to the first movement apparatus in the radial direction, to locate the cutting edge of the turning tool at a second radial position in the radial direction to correct the error; and
   driving the second movement apparatus to move the turning tool toward the workpiece in the axial direction to perform second turning on the workpiece while the cutting edge is kept at the second radial position in the radial direction.

2. The turning method according to claim 1, wherein the first movement apparatus is stopped in a state in which the cutting edge of the turning tool is located at the first radial position.

3. The turning method according to claim 2, wherein the third movement apparatus moves the turning tool relative to the first movement apparatus by an amount corresponding to the error.

4. The turning method according to claim 1, wherein the third movement apparatus moves the turning tool relative to the first movement apparatus by an amount corresponding to the error.

5. The turning method according to claim 1, wherein the third movement apparatus moves the turning tool relative to the first movement apparatus within one millimeter.

6. The turning method according to claim 1, wherein the turning is performed on an inside of a recess of the workpiece.

7. A turning method comprising:

rotating a workpiece about a rotation axis;

driving a second movement apparatus, which is configured to move the turning tool in an axial direction parallel to the rotation axis, to locate a cutting edge of the turning tool at a first axial position in the axial direction;

driving a first movement apparatus, which is configured to move a turning tool in a radial direction of the rotation axis, to move the turning tool toward the workpiece in the radial direction to perform first turning on the workpiece while the cutting edge is kept at the first axial position in the axial direction;

driving the first movement apparatus to move the turning tool in the radial direction away from the workpiece after performing the first turning on the workpiece;

measuring a processed dimension of the workpiece on which the first turning has been performed;

calculating an error between the processed dimension and a target dimension;

driving a fourth movement apparatus, which is configured to move the turning tool relative to the second movement apparatus in the axial direction, to locate the cutting edge of the turning tool at a second axial position in the axial direction to correct the error; and driving the first movement apparatus to move the turning tool toward the workpiece in the radial direction to perform second turning on the workpiece while the cutting edge is kept at the second axial position in the axial direction.

8. The turning method according to claim 7, wherein the second movement apparatus is stopped in a state in which the cutting edge of the turning tool is located at the first axial position.

9. The turning method according to claim 7, wherein the fourth movement apparatus moves the turning tool relative to the second movement apparatus by an amount corresponding to the error.

10. The turning method according to claim 7, wherein the fourth movement apparatus moves the turning tool relative to the second movement apparatus within one millimeter.

11. A machining system comprising:

a machining apparatus configured to perform turning on a workpiece and comprising:

a spindle configured to rotate the workpiece about a rotation axis;

a first movement apparatus configured to move a turning tool in a radial direction of the rotation axis;

a second movement apparatus configured to move the turning tool in an axial direction parallel to the rotation axis; and a third movement apparatus configured to move the turning tool relative to the first movement apparatus in the radial direction and having a movable range in the radial direction smaller than a movable range in the radial direction of the first movement apparatus;

a measuring apparatus configured to measure a dimension of the workpiece; and a controller configured to drive the first movement apparatus to locate a cutting edge of the turning tool at a first radial position in the radial direction;

drive the second movement apparatus to move the turning tool toward the workpiece in the axial direction to perform first turning on the workpiece while the cutting edge is kept at the first radial position in the radial direction;

drive the second movement apparatus to move the turning tool in the axial direction away from the workpiece after performing the first turning on the workpiece;

measure, with the measuring apparatus, a processed dimension of the workpiece on which the first turning has been performed;

calculate an error between the processed dimension and a target dimension;

drive the third movement apparatus to locate the cutting edge of the turning tool at a second radial position in the radial direction to correct the error; and drive the second movement apparatus to move the turning tool toward the workpiece in the axial direction to perform second turning on the workpiece while the cutting edge is kept at the second radial position in the radial direction.

12. The machining system according to claim 11, wherein the movable range of the third movement apparatus is at most $\frac{1}{100}$ the movable range of the first movement apparatus.

13. A machining system comprising:

a machining apparatus configured to perform turning on a workpiece and comprising:

a spindle configured to rotate the workpiece about a rotation axis;

a first movement apparatus configured to move a turning tool in a radial direction of the rotation axis;

a second movement apparatus configured to move the turning tool in an axial direction parallel to the rotation axis; and a fourth movement apparatus configured to move the turning tool relative to the second movement apparatus in the axial direction and having a movable range in the axial direction smaller than a movable range in the axial direction of the second movement apparatus;

a measuring apparatus configured to measure a dimension of the workpiece; and a controller configured to drive the second movement apparatus to locate a cutting edge of the turning tool at a first axial position in the axial direction;

drive the first movement apparatus to move the turning tool toward the workpiece in the radial direction to perform first turning on the workpiece while the cutting edge is kept at the first axial position in the axial direction;

drive the first movement apparatus to move the turning tool in the radial direction away from the workpiece after performing the first turning on the workpiece;

measure, with the measuring apparatus, a processed dimension of the workpiece on which the first turning has been performed;

calculate an error between the processed dimension and a target dimension;

drive the fourth movement apparatus to locate the cutting edge of the turning tool at a second axial position in the axial direction to correct the error; and drive the first movement apparatus to move the turning tool toward the workpiece in the radial direction to perform second turning on the workpiece while the cutting edge is kept at the second axial position in the axial direction.

14. The machining system according to claim 13, wherein the movable range of the fourth movement apparatus is at most ¹⁄₁₀₀ the movable range of the second movement apparatus.

15. A non-transitory computer readable storage medium retrievably storing a computer-executable program therein, the computer-executable program causing a computer to perform a turning method, the turning method comprising:

rotating a workpiece about a rotation axis;

driving a first movement apparatus, which is configured to move a turning tool in a radial direction of the rotation axis, to locate a cutting edge of the turning tool at a first radial position in the radial direction;

driving a second movement apparatus, which is configured to move the turning tool in an axial direction parallel to the rotation axis, to move the turning tool toward the workpiece in the axial direction to perform first turning on the workpiece while the cutting edge is kept at the first radial position in the radial direction;

driving the second movement apparatus to move the turning tool in the axial direction away from the workpiece after performing the first turning on the workpiece;

measuring a processed dimension of the workpiece on which the first turning has been performed;

calculating an error between the processed dimension and a target dimension;

driving a third movement apparatus, which is configured to move the turning tool relative to the first movement apparatus in the radial direction, to locate the cutting edge of the turning tool at a second radial position in the radial direction to correct the error; and driving the second movement apparatus to move the turning tool toward the workpiece in the axial direction to perform second turning on the workpiece while the cutting edge is kept at the second radial position in the radial direction.

16. A non-transitory computer readable storage medium retrievably storing a computer-executable program therein, the computer-executable program causing a computer to perform a turning method, the turning method comprising:

rotating a workpiece about a rotation axis;

driving a second movement apparatus, which is configured to move the turning tool in an axial direction parallel to the rotation axis, to locate a cutting edge of the turning tool at a first axial position in the axial direction;

driving a first movement apparatus, which is configured to move a turning tool in a radial direction of the rotation axis, to move the turning tool toward the workpiece in the radial direction to perform first turning on the workpiece while the cutting edge is kept at the first axial position in the axial direction;

driving the first movement apparatus to move the turning tool in the radial direction away from the workpiece after performing the first turning on the workpiece;

measuring a processed dimension of the workpiece on which the first turning has been performed;

calculating an error between the processed dimension and a target dimension;

driving a fourth movement apparatus, which is configured to move the turning tool relative to the second movement apparatus in the axial direction, to locate the cutting edge of the turning tool at a second axial position in the axial direction to correct the error; and driving the first movement apparatus to move the turning tool toward the workpiece in the radial direction to perform second turning on the workpiece while the cutting edge is kept at the second axial position in the axial direction.

* * * * *